US005435982A

United States Patent [19]

[11] Patent Number: 5,435,982

[45] Date of Patent: Jul. 25, 1995

Wilkinson

[54] METHOD FOR DISSOCIATING WASTE IN A PACKED BED REACTOR

[75] Inventor: Mark A. Wilkinson, Lexington, Mass.

[73] Assignee: Molten Metal Technology, Inc., Waltham, Mass.

[21] Appl. No.: 267,295

[22] Filed: Jun. 27, 1994

Related U.S. Application Data

[63] Continuation of Ser. No. 41,405, Mar. 31, 1993, abandoned.

[51] Int. Cl.[6] .......................... C01B 31/20; F23G 5/44

[52] U.S. Cl. ................................ 423/437 R; 588/201; 423/418.2; 423/650; 423/DIG. 12

[58] Field of Search ........................ 588/201; 501/155; 252/635; 423/650, 651, 418.2, DIG. 12, 437 R

[56] References Cited

U.S. PATENT DOCUMENTS

| | | | |
|---|---|---|---|
| 3,025,155 | 3/1962 | Lee et al. | 75/68 |
| 3,172,757 | 3/1965 | Hess et al. | 75/67 |
| 3,737,303 | 6/1973 | Blayden et al. | 75/68 |
| 3,737,304 | 6/1973 | Blayden et al. | 75/68 |
| 3,753,690 | 8/1973 | Emley et al. | 75/68 |
| 4,165,235 | 8/1979 | Dantzig et al. | 75/93 |
| 4,277,280 | 7/1981 | Montgrain | 75/68 |
| 4,399,108 | 8/1983 | Krikorian et al. | 423/DIG. 12 |
| 4,494,985 | 1/1985 | Butler et al. | 75/93 |
| 4,568,430 | 2/1986 | Vire | 204/67 |
| 4,574,714 | 3/1986 | Bach et al. | 110/346 |
| 4,602,574 | 7/1986 | Bach et al. | 110/346 |
| 5,177,304 | 1/1993 | Nagel | 588/201 |

*Primary Examiner*—Ferris Lander
*Assistant Examiner*—Stuart L. Hendrickson
*Attorney, Agent, or Firm*—Hamilton, Brook, Smith & Reynolds

[57] ABSTRACT

A method for dissociating waste to its atomic constituents in a molten metal bath wherein the molten metal bath includes a refractory packing. The refractory packing is disposed in the molten metal bath to restrict the flow of waste and waste dissociation products through the molten metal and around the refractory packing to tortuous flow paths.

18 Claims, 2 Drawing Sheets

METHOD FOR DISSOCIATING WASTE IN A PACKED BED REACTOR

RELATED APPLICATION

This application is a continuation of application Ser. No. 08/041,405, now abandoned filed Mar. 31, 1993, the contents of which is incorporated herein in its entirety by reference.

BACKGROUND OF THE INVENTION

Many types of hazardous wastes are generated every year. The wastes include organic materials, such as pesticides, polychlorinated biphenyls, polybrominated biphenyls, paints and solvents. Also, other wastes include inorganic material, such as the oxides of iron, zinc, aluminum, copper and magnesium and such salts as ferric chloride, ferrous chloride, aluminum chloride, etc.

Disposal of wastes in landfills and by incineration has become an increasingly difficult problem because of diminishing availability of disposal space, strengthened governmental regulations, and the growing public awareness of the impact of hazardous substance contamination upon the environment. Release of hazardous organic wastes to the environment can contaminate air and water supplies thereby diminishing the quality of life in the affected populations.

To minimize the environmental effects of the disposal of organic wastes, methods must be developed to convert these wastes into benign, and preferably, useful substances. In response to this need, there has been a substantial investment in the development of a variety of methods for treating hazardous organic wastes. One of the most promising new methods is described in U.S. Pat. Nos. 4,574,714 and 4,607,574, issued to Bach and Nagel. The Bach/Nagel method for destroying organic material, including toxic wastes, involves dissociation of the organic material to its atomic constituents in a molten metal and reformation of these atomic constituents into environmentally acceptable products, including hydrogen, carbon monoxide and/or carbon dioxide gases.

SUMMARY OF THE INVENTION

The present invention relates to a method for the dissociation of at least a portion waste to its atomic constituents in a molten metal bath and the reformulation of atomic constituents to form products.

In one embodiment, the method involves forming a molten metal bath in a reactor, and maintaining this bath under conditions sufficient to dissociate at least a portion of waste to its atomic constituents. A refractory packing is introduced into the molten metal bath and waste is thereafter introduced into the molten metal bath, whereby at least a portion of the waste dissociates to its atomic constituents and whereby the atomic constituents reformulate into products contained in at least one phase, for example a gaseous phase, a molten metal phase or a vitreous phase.

This invention provides the advantage of increased waste residence time in the molten metal bath and also increased total gas-to-molten metal surface areas. Further advantages include the reduced likelihood that waste injected at the bottom of the reactor will blow through the molten metal bath and also reduced splashing of the molten metal in the reactor. An additional advantage is the removal of particulate and/or chemical impurities from a gaseous phase or metal phase product. In many cases, the packing results in enhanced waste dissociation and/or reformulation into environmentally acceptable products.

Detailed Description of the Invention

The features and other details of the method of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the present invention.

This invention is based upon the Bach/Nagel method disclosed in U.S. Pat. Nos. 4,574,714 and 4,602,574, which disclose a method for destroying waste by dissociating the waste to its atomic constituents in a molten metal bath and for reforming these atomic constituents to form various products. The teachings of U.S. Pat. Nos. 4,574,714 and 4,602,574 are incorporated herein by reference.

Figure 1:
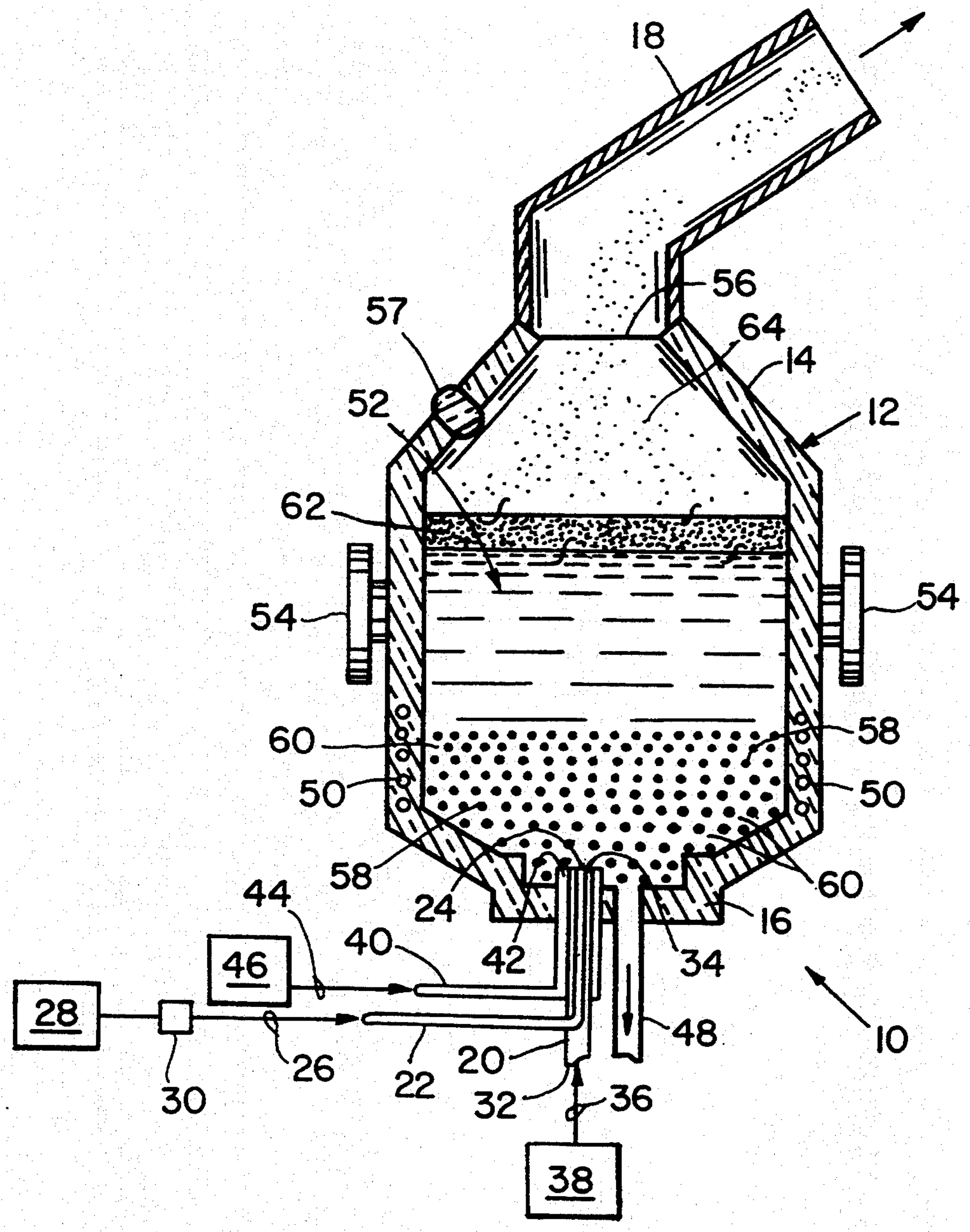
FIG. 1 is a cut-away side elevational illustration of a packed bed reactor suitable or the method for dissociation of waste materials according to this invention.

In one embodiment of the present invention, apparatus 10 is illustrated in FIG. 1. Apparatus 10 includes reactor 12. Examples of suitable reactors, fitted with appropriate injection means, include "T"-shaped reactors, top and bottom-blown basic oxygen process reactors (K-BOP and Q-BOP, respectively), argon-oxygen decarbonization furnace (AOD), electric arc furnaces (EAF), etc. which have been fitted with a suitable means for charging or injection through the top, bottom or sides of the reactor, such as is known in conventional steelmaking practices. Reactor 12 includes upper portion 14 and lower portion 16. Gas outlet 18, which extends from upper portion 14, is suitable for conducting a gaseous product out of reactor 12.

Tuyere 20 is a triple concentric tuyere, which includes waste inlet tube 22 and waste inlet 24, and which extends from lower portion 16 of reactor 12. Tuyere 20 is dimensioned and configured for introducing a waste, an oxidant and a shroud gas into reactor 12.

Line 26, which extends between waste source 28 and waste inlet tube 22, provides fluid communication between waste source 28 and lower portion 16 of reactor 12, through waste inlet tube 22 and waste inlet 24. Means 30 is disposed at line 26 for directing waste from waste source 28 through waste inlet tube 22. A suitable means for directing waste, for example, is a pump. It is to be understood that, alternatively, waste can be directed from waste source 26 through waste inlet tube 22 of tuyere 20 by other suitable means, such as by pressurization of waste source 28. Other means, such as an injection lance (not shown) can also be employed to introduce waste into lower portion 16 of reactor 12.

Tuyere 20 also includes oxidant inlet tube 32 for injecting a separate oxidant into reactor 12 through oxidant inlet 34. Line 36 provides fluid communication between oxidant source 38 and lower portion 16 of reactor 12 through oxidant inlet tube 32 and oxidant inlet 34. Oxidant inlet tube 32 of tuyere 20 is disposed concentrically about waste inlet tube 22 at waste inlet 24.

Tuyere 20 further includes shroud gas tube 40 for injecting a separate shroud gas, needed to shroud tuyere 20, through shroud gas inlet 42 into a lower portion 16 of reactor 12. Line 44 extends between shroud gas tube 40 and shroud gas source 46 for conducting a suitable shroud gas source 46 through shroud gas inlet 42. Shroud gas tube 40 of tuyere 20 is disposed concentrically about oxidant inlet tube 32 at oxidant inlet 34. Examples of suitable shroud gases include nitrogen gas, steam and methane.

It is to be understood that waste and oxidant can be introduced into reactor 12 continuously, sequentially or intermittently. It is also to be understood that waste and oxidant can be injected into reactor 12 through other suitable configurations, such as other multiple concentric tuyeres, a conjoined tuyere or separate waste and oxidant tuyeres. Additionally, it is to be understood that means for injecting oxidant and/or waste can include other suitable forms, for example, a consumable lance. Furthermore, it is to be understood that more than one waste inlet tube or more than one oxidant inlet tube, or combinations thereof, can be disposed at the top, bottom or side portions of reactor 12 for the introduction of waste and an oxidant agent into lower portion 16 of reactor 12.

In one embodiment, the waste and oxidant are introduced according to the method and system described in U.S. patent application Ser. No. 07/737,199, filed Jul. 29, 1991, which discloses the formation of oxides of dissolved atomic constituents in a molten metal bath. The teachings of U.S. patent application Ser. No. 07/737,199 are incorporated herein by reference.

Bottom tap 48 extends from lower portion 16 of reactor 12 and is suitable for removal of molten metal from reactor 12. Additional drains may be provided as a means of removing continuously, or discretely, additional phases. Material can also be removed by other methods, such as are known in the art.

Induction coil 50 is disposed at lower portion 16 of reactor 12 for heating molten metal bath 52 in reactor 12. It is to be understood that, alternatively, reactor 12 can be heated by other suitable means, such as by oxyfuel burners, electric arcs, etc.

Trunions 54 can be disposed at reactor 12 for manipulation of reactor 12. Seal 56 is disposed between reactor 12 and reactor gas outlet 18 and is suitable for allowing partial rotation of reactor 12 about trunions 54 without breaking seal 56.

Molten metal bath 52 is disposed within reactor 12. In one embodiment, molten metal bath 52 includes a metal having a free energy of oxidation, at the operating conditions of reactor 12 which is greater than that of the conversion of atomic carbon to carbon monoxide. Examples of suitable metals can include iron, chromium, manganese, copper, nickel, cobalt, or combinations thereof. Also it is understood that molten metal bath 52 can include oxides of the molten metal. As disclosed in U.S. Pat. No. 5,177,304, the teachings of which are incorporated herein by reference, molten metal bath 52 can include more than one phase of molten metal.

In another embodiment, wherein the waste includes organic waste, suitable metals must also have a carbon solubility sufficient to allow significant amounts of hydrogen to be generated as organic waste is dissociated and the molten metal bath becomes carbonized. Thus, metals with a carbon solubility of greater than about 0.5 percent, by weight, are preferred, and those with a carbon solubility of greater than about two percent, by weight, are particularly preferred. In the cases where more than one metal is employed, at least one of the metals should have the aforementioned carbon solubility.

Molten metal bath 52 is formed by partially filling reactor 12 with a suitable metal. A suitable metal can be directed into reactor 12 through hatch 57, which is disposed at upper portion 14 of reactor 12, wherein hatch 57 is sufficient to conduct scrap metal, solid metal or molten metal, and also refractory packing, into upper portion 14 of reactor 12. It is to be understood that reactor 12 can be filled with metal to form molten metal bath 52 by other suitable means, for example, a lance. The metal is then heated to a suitable temperature by activating induction coil 50 or by other means, not shown. In one embodiment, the viscosity of molten metal bath 52 is no greater than about 10 centipoise.

Refractory packing 58 is disposed within molten metal bath 52 to thereby limit the flow of waste, through the molten metal bath occupying packing spaces 60, to tortuous flow. As defined herein, refractory means neither melting nor softening in the operating range of apparatus 10, which is typically about 1300° C. to 1700° C.

Optionally, refractory packing 58 is either fixed or non-fixed in reactor 12. Where refractory packing 58 is non-fixed, it can be buoyant or non-buoyant within molten metal bath 52. Furthermore, refractory packing 58 can either be reactive or substantially unreactive towards a constituent of the waste or decomposed waste. However, refractory packing 58 is typically unreactive towards molten metal bath 52. Furthermore, the individual packing components constituting refractory packing 58 can be shaped as spheres, pyramids, cylinders or any other shape suitable to form a refractory packing that can be sufficiently disposed in molten metal bath 52 to limit the flow of waste around refractory packing 58 to tortuous flow.

In one embodiment, refractory packing 58 is directed into molten metal bath 52 in reactor 12 through hatch 57. Refractory packing 58 then sufficiently settles in molten metal bath 52 to form packing spaces 60 and to result in tortuous flow paths around refractory packing 58.

In an alternate embodiment, refractory packing 58 is directed into reactor 12 prior to forming molten metal bath 52 in reactor 12. In another embodiment, refractory packing 58 is permanently fixed in place in lower portion 16 of reactor 12 and molten metal is directed into reactor 12 and around reactor packing 58 to form molten metal bath 52. In a preferred embodiment, refractory packing 58 is unreactive, non-fixed and non-buoyant packing, and is directed into molten metal bath 52 to form refractory packing 58.

Additionally, molten metal bath 52 can have a vitreous or slag layer 62. Vitreous layer 62, which is disposed on molten metal bath 52, is substantially immiscible with molten metal bath 52. Vitreous layer 62 can have a lower thermal conductivity than that of molten metal bath 52. Radiant heat loss from molten metal bath 52 can thereby be reduced to significantly below the radiant heat loss from molten bath where no vitreous layer is present.

Examples of metal oxides typically found in vitreous layer 62 include titanium dioxide ($TiO_2$), zirconium oxide ($ZrO_2$), aluminum oxide ($Al_2O_3$), magnesium oxide (MgO), calcium oxide (CaO), etc. It is to be understood that vitreous layer 62 can include more than one metal oxide. Vitreous layer 62 is fluid and monatomic species and other gases can pass across vitreous layer 62 from molten metal bath 52. Typically, vitreous layer 62 can contain a suitable compound, for example CaO, for scrubbing halogens, such as chlorine or fluorine, to prevent possible formation of halogen gases or hydrogen halide gases, such as hydrogen chloride gas.

In one embodiment, vitreous layer 62 includes at least one metal oxide having a free energy of oxidation, at the operating conditions of apparatus 10, which is less than that for the oxidation of atomic carbon to carbon monoxide, such as calcium oxide (CaO).

Gas layer 64 develops over vitreous layer 62 in upper portion 14 of reactor 12. Gas layer 64 can comprise an oxidant and gaseous dissociation products of the waste. In a preferred embodiment, gas layer 64 comprises the gaseous monatomic dissociation products of the waste and multi-atomic species reformulated from the atomic constituents of the dissociated waste.

Additionally, second refractory packing 66 is sufficiently disposed in reactor 12 to remove physical and/or chemical impurities from the gaseous products by restricting the flow of gaseous products, from gas layer 64 or from molten metal bath 52 through second packing spaces 68 to gas outlet 18, to tortuous flow. Second refractory packing 66 is a fixed packing, which is disposed between molten metal bath 52 and gas outlet 18. Optionally, second refractory packing 66 can be either reactive or unreactive such as towards a constituent of the dissociated waste to form a reformulated product. However, second refractory packing 66 is typically unreactive towards molten metal bath 52.

Figure 2:
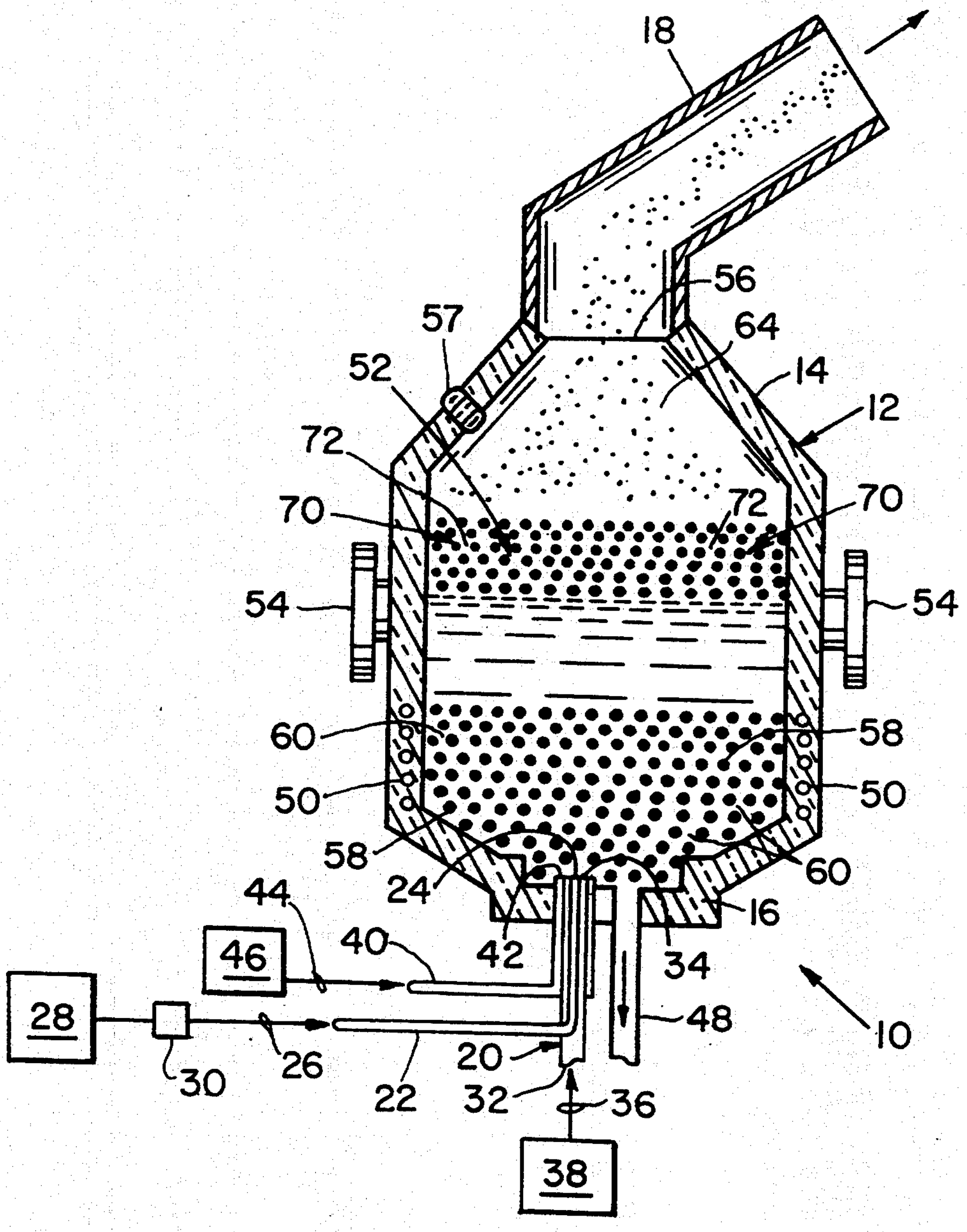
FIG. 2 is a cut-away side elevational illustration of a second packed bed reactor suitable or the method for dissociation of waste materials according to this invention.

In yet another embodiment, shown in FIG. 2 and having many of the same elements as in FIG. 1, reactor 12 contains alternate second refractory packing 70, which is a buoyant packing disposed in molten metal bath 52 above first refractory packing 58. Alternate second refractory packing 70 is sufficiently disposed in reactor 12 to remove physical and/or chemical impurities from the gaseous products by restricting the flow of gaseous products or molten metal from molten metal bath 52 through third packing spaces 72 to tortuous flow. Optionally, alternate second refractory packing 70 can be either reactive or unreactive towards an atomic constituent of the decomposed waste. However, alternate second refractory packing 70 is unreactive towards molten metal bath 52.

A wide variety of waste material can be processed by the method of this invention. This waste can include inorganic, organic and organometallic wastes. In a preferred embodiment, the waste includes organic waste. An example of a suitable organic waste is a hydrogen-containing carbonaceous material, such as oil or a waste which includes organic compounds containing nitrogen, sulfur, oxygen etc. It is to be understood that the organic material can include inorganic compounds. In addition to carbon and hydrogen, the organic material can include other atomic constituents, such as halogens, metals, etc. Organic waste does not need to be anhydrous.

Waste is directed from waste source 28 through line 24 and waste inlet tube 22, by means 26, into molten metal bath 52 substantially below refractory packing 58. In one embodiment, the waste is a fluid which can include waste components dissolved or suspended within a liquid. In another, solid particles of waste components are suspended in an inert gas, such as argon.

Upon injection of the waste into molten metal bath 52, the waste gasifies and/or dissociates to form at least one gaseous component. The gaseous component then migrates through molten metal bath 52, by diffusion, bubbling or other means, and then through packing spaces 60 within refractory packing 58. While present in molten metal bath 52, at least a portion of the waste dissociates to its atomic constituents. Furthermore, migration of the gaseous component through packing spaces 60 lengthens the distance that the gaseous component must travel through molten metal bath 52 before entering gas layer 64 in upper portion 14 of reactor 12. Thus, migration of the gaseous component around refractory packing 58 in molten metal bath 52 enhances the dissociation of waste to forms gaseous and non-gaseous atomic constituents.

In one embodiment, at least a portion of organic waste directed through packing spaces 60 within refractory packing 58, is converted to carbon, hydrogen and its other atomic constituents. The atomic hydrogen is then formed into hydrogen gas while the atomic carbon, in the absence of an oxidizing agent remains in solution in molten metal bath 52. Thus, in one embodiment, molten metal bath 52 is carbonized.

Oxidant is also directed from oxidant source 38 through oxidant inlet tube 32 and oxidant inlet 34 into molten metal bath 52 in reactor 12. Therein, the oxidant, such as oxygen, oxidizes the atomic carbon generated from the dissociation of the waste, to form carbon oxide gases, such as carbon monoxide or carbon dioxide. Separate or combined streams of hydrogen and carbon oxide gases can be formed depending upon the sequencing of the introduction of waste and of oxidant into molten metal bath 52.

In one embodiment, the waste and oxidant are introduced according to the method and system described in U.S. patent application Ser. No. 07/895,358, filed Jun. 8, 1992, which discloses the formation of separate enriched streams of hydrogen and carbon oxide gases from the dissociation of organic waste in a molten metal bath. The teachings of U.S. patent application Ser. No. 07/895,358 are incorporated herein by reference.

The gaseous atomic constituents then migrate out of molten metal bath 52 into gas layer 64 in upper portion 14 of reactor 12. Concurrently, at least a portion of the gaseous atomic constituents combine to form gaseous molecules, such as diatomic hydrogen, diatomic chlorine, etc. The gaseous monatomic constituents and gaseous molecules constitute the gaseous product. The gaseous product is then directed out of reactor 12 through gas outlet 18.

At least a portion of the non-gaseous atomic constituents remain dissolved or entrained in molten metal bath 52.

In one embodiment, the gaseous product passes from molten metal bath 52 into vitreous layer 62 to scrub undesirable impurities, such as halogens, from the gaseous product.

In a preferred embodiment, the gaseous product is directed through second packing spaces 68 in second refractory packing 66 prior to exiting reactor 12 through gas outlet 18. The flow of the gaseous product through a tortuous flow path around second refractory packing 66 removes at least a portion of any physical impurities, such as particulates or liquids, entrained within the gaseous product, thereby forming a purer gaseous product.

In an alternate embodiment, upon injection of a waste into molten metal bath 52 and/or while the waste is migrating through packing spaces 60 within refractory packing 58, such as by diffusion or circulation, a portion of the waste volatilizes without dissociation, to form a gaseous waste component and a non-gaseous component. The gaseous component then forms gas layer 64 in upper portion 14 of reactor 12. The non-gaseous component remains in molten metal bath 52 or vitreous layer 62.

In yet another embodiment, upon injection of a waste into a molten metal bath, at least a portion of the waste is combined with another substance, or vitreous layer 62, to form a new or modified vitreous layer.

Equivalents

Those skilled in the art will recognize, or be able to ascertain using no more than routine experimentation, many equivalents to the specific embodiments of the invention described specifically herein. Such equivalents are intended to be encompassed in the scope of the claims.

I claim:

1. A method for dissociating waste in a molten metal bath into atomic constituents and reformulating said constituents into products contained in at least one phase, comprising the steps of:

a) forming the molten metal bath in a reactor;
b) introducing a refractory packing into the molten metal bath in said reactor to form a refractory packed bed; and subsequently
c) introducing waste into said molten metal bath, wherein said molten metal bath contains the packed bed, whereby the waste dissociates to said atomic constituents and whereby said atomic constituents reformulate into products contained in at least one phase.

2. A method of claim 1 wherein said refractory packed bed comprises uranium dioxide.

3. A method of claim 1 wherein said refractory packed bed comprises a mixture of calcium oxide and uranium dioxide.

4. A method of claim 2 further comprising the step of introducing an oxidizing agent into said molten metal bath.

5. A method of claim 4 wherein the oxidizing agent comprises oxygen.

6. A method of claim 1 further comprising the step of directing the product in a gaseous phase through a second refractory packed bed in said reactor, said second refractory packing removing a chemical or physical impurity from said product.

7. A method of claim 6 wherein said second refractory packed bed in reactive with a constituent of the waste introduced into the molten metal bath.

8. A method of claim 7 wherein said second refractory packed bed floats above said first packed bed.

9. A method of claim 8 wherein said second refractory packed bed comprises calcium oxide.

10. A method of claim 5 wherein said molten metal bath comprises iron.

11. A method of claim 5 wherein the molten metal bath is comprised of a metal selected to provide an increased molar ratio of carbon dioxide/carbon monoxide compared to that produced in molten iron under the same conditions.

12. A method of claim 5 wherein the molten metal comprises manganese.

13. A method of claim 5 wherein the molten metal bath comprises two immiscible metals having a first immiscible metal having a free energy of oxidation, at the conditions of the molten metal bath, greater than that of oxidation of atomic carbon to form carbon monoxide and a second immiscible metal having a free energy of oxidation, at the conditions of the molten metal bath, greater than that of oxidation of carbon monoxide to form carbon dioxide.

14. A method of claim 13 wherein said molten metal bath comprises an immiscible mixture of iron and copper.

15. A method of claim 5 wherein the reactor further includes a vitreous layer which is disposed above the molten metal bath, for removing at least a portion of an impurity from a gaseous product.

16. A method for dissociating organic waste in a molten metal bath into its atomic constituents and reformulating said constituents into products contained in at least one phase, comprising the steps of:

a) forming the molten metal bath in a reactor;
b) introducing uranium dioxide packing into said molten metal bath to form a refractory packed bed;
c) subsequently introducing organic waste into said molten metal bath whereby the organic waste dissociates to generate hydrogen gas and to carbonize the molten metal bath; and
d) adding an oxidizing agent into said carbonized molten metal bath to generate carbon oxide gas.

17. A method of claim 16 further comprising the step of forming a calcium oxide refractory packed bed in said reactor above the molten metal bath, whereby hydrogen gas and carbon oxide gas discharged from the molten metal bath pass through the calcium oxide refractory packed bed and are purified in said calcium oxide refractory packed bed.

18. A method for volatilizing a volatilizable component of waste in a molten metal bath to form a gaseous waste component and a non-gaseous waste component, comprising the steps of:

a) forming the molten metal bath in a reactor;
b) introducing a refractory packing into the molten metal bath in said reactor to form a refractory packed bed; and subsequently
c) introducing waste into said molten metal bath, wherein said molten metal bath contains the refractory packed bed, whereby the volatilizable waste component volatilizes to form a gaseous waste component and a non-gaseous waste component.

* * * * *